United States Patent Office 3,007,852
Patented Nov. 7, 1961

3,007,852
METHOD FOR STRIPPING A SOLVENT FROM A RUBBERY LATEX
Edward Allen Hunter, Baton Rouge, La., and Augustus B. Small, Westfield, N.J., assignors to Esso Research and Engineering Company, a corporation of Delaware
No Drawing. Filed Apr. 17, 1958, Ser. No. 729,071
13 Claims. (Cl. 202—46)

This invention relates to producing butyl rubber latices, and more particularly to converting raw butyl rubber latex (i.e. a butyl rubber latex containing a solvent) into finished butyl rubber latex products by means of stripping the raw latex through an immiscible liquid as more fully described hereinafter.

In the stripping with steam of raw latex and especially butyl rubber latex it has been found that a substantial amount of coagulation takes place; namely, about 5 to 25% of the polymer content of the latex depending upon whether the stripping steam was introduced direct, spargering, or by other multiple steam jet conduit means. It has now been found however that if the raw latex containing a solvent such as hydrocarbon is disposed as an immiscible liquid layer above a lower immiscible liquid layer and a stripping medium such as steam, nitrogen, carbon dioxide, methane, ethane, propane or the like is introduced into said lower immiscible liquid layer, coagulation is substantially lessened and the hydrocarbon solvent effectively volatilized off. In order for a liquid layer to be below the raw latex layer it is necessary that said lower immiscible layer have a higher specific gravity than specific gravity of the raw latex layer. Suitable dense liquid immiscible layers include among others mercury, gallium, certain fluorinated hydrocarbons and silicone liquids, but especially molten Wood's metal alloy.

The stripping conditions are generally at about 150 to 250° F. depending upon whether vacuum or pressure is employed, although neither vacuum or pressure need be employed in accordance with the present invention. Stripping times of between about 0.1 minute and 5 hours, preferably between 1 and 30 minutes are employed to produce finished latices having solids contents of about 15 to 60 weight percent, preferably 20 to 55 weight percent solids.

The preferred rubbery polymers which come within the scope of the present invention are copolymers such as described in U.S. Patent 2,356,128, comprising a major proportion of a monoolefin having from 4 to 6 carbon atoms, such as isobutylene, and minor proportion of a multiolefin having 4 to 12 carbon atoms. The preferred multiolefins are conjugated diolefins, such as isoprene, butadiene-1,3, piperylene or such multiolefins as myrcene and the like. Of these, isoprene is considered to be the best. Generally, about 1 to 10 parts by weight of the multiolefin are reacted with about 90 to 99 parts by weight of the monoolefin at a low temperature and in the presence of a dissolved Friedel-Crafts type catalyst. For instance, about 1.5 parts of isoprene are reacted with 98.5 parts of isobutylene in the presence of aluminum chloride at a temperature between about −30 and −260° F. The catalyst is added to the monomers in a dissolved form and the polymerization proceeds rapidly to yield the desired polymer which precipitates out of the solution in the form of a flocculent white solid having many of the physical characteristics of raw gum rubber. When the polymerization has reached the desired stage, the material is conveniently recovered by discharging the whole mixture into warm water which may contain an alcohol or other material to inactivate the catalyst. The warm water flashes off the excess refrigerant, unpolymerized olefins and catalyst solvent. The polymer is recovered by straining or filtering or by other means and then dried. Before drying, the polymer has a Staudinger molecular weight from 15,000 to about 100,000 or more.

Other rubbery polymers which may be stripped in accordance with the present invention include natural rubber, GR–S rubber (diene styrene copolymers prepared by the use of a peroxide catalyst), polychlorobutadiene, GR–N rubber (a diene acrylonitrile rubber prepared by an emulsion polymerization in the presence of peroxide catalyst) halogenated isoolefinmultiolefin copolymers particularly chlorinated or brominated butyl rubber containing at least 0.5 weight percent halogen but not more than about 1 atom of chlorine or 2 atoms of bromine for each double bond in the copolymer, mixtures thereof, and similar rubbery copolymers.

In order to manufacture the raw butyl rubber latex to be stripped in accordance with the present invention, the rubbery polymer is dissolved preferably in a rubber solvent such as a hydrocarbon having 5 to 10 carbon atoms e.g. hexane, pentane, cyclohexane, naphtha, mineral spirits or the like. The hydrocarbon solution is then emulsified in the presence of water containing at least one emulsifier to produce the raw butyl latex. To perform this emulsification, mechanical work is preferably supplied to break down the solution of butyl rubber into particles of colloidal size. Mixers commonly used to supply this mechanical action include among others, high speed stirrers such as dispersators, high sheer producing mixers such as colloid mills, high pressure homogenizers and homogenization by sound energy such as the Rapisonic Homogenizer.

Typical emulsifiers which may be used among others include those containing at least one ethylene oxide unit. The following is a list of emulsifiers suitable to the purpose of this invention: sodium polyoxyethylene nonyl phenol sulfate, sodium polyoxyethylene decyl sulfate, sodium polyoxyethylene lauryl sulfate, ammonium polyoxyethylene nonyl phenol sulfate, ammonium polyoxyethylene disulfate and ammonium polyoxyethylene dodecyl sulfate. Normally these sulfate emulsifiers are employed in amounts between about 0.5 to 10 parts by weight per 100 parts by weight of rubber and preferably between 2 and 5 parts by weight per 100 parts by weight of rubber.

Also the addition of smaller quantities of an orthophosphate salt, that is, about 0.1 to 2 parts per 100 of rubber, improves the stability of the latex emulsification, particularly with respect with processing stability. The effect of this stabilizing phenomenon is not merely additive since when used alone it will not produce a stable emulsion. It is preferred that the stabilizer be used in the amount particularly about 0.5 and about 1.5 parts per 100 of rubber and it is especially desirable to use about 1 to 1.5 parts per 100 of rubber of the orthophosphate salt.

Other emulsifiers which are useful include potassium oleate, sodium lauryl sulfate, di-isobutyl phenoxy ethyoxy ethyl dimethylol benzyl ammonium chloride, dimethyl phenoxy ethoxy ethyl dimethyl ammonium chloride and such emulsifiers as the polyoxy ethylated alkyl phenols. These latter emulsifiers may be used in amounts of between about 1 to 10 parts per 100 parts of rubber.

In practicing the present invention a solution of butyl rubber is contacted with an aqueous solution of an emulsifier and these two components intimately mixed and then homogenized say in a Rapisonic Homogenizer as outlined above. This is the raw butyl rubber latex. There is then charged to the same flask containing the raw butyl rubber latex a denser immiscible liquid, preferably Wood's metal alloy. Alternately the raw butyl rubber latex may be preheated prior to disposing the same as a layer above a more dense immiscible liquid to a temperature of between about 100 and 175° F. so as to cause the lower immiscible liquid layer to be in liquid form. However, when using such materials as mercury, certain fluorinated hydrocarbons and most silicones, such heating steps may advantageously be dispensed with. There is then bubbled below the level of the raw immiscible liquid layer sufficient steam to strip out essentially all of the solvent resulting in a finished latex which may be drawn off from the upper layer.

In order to more fully illustrate the present invention, the following experimental data are given:

EXAMPLE

A raw butyl rubber latex was prepared having the following composition:

| Component: | Weight percent |
|---|---|
| Butyl rubber copolymer | 15 |
| Hexane | 48 |
| Water | 37 |

Also included in the raw latex were the following emulsifiers in the following proportions:

| Emulsifier: | Parts per 100 parts of copolymer |
|---|---|
| Sodium tetraoxyethylene nonyl phenol sulfate (Alipal CO–433) | 5 |
| Sodium dihydrogen phosphate | 1 |

1,000 cc. of this latex were prestripped by boiling off the hexane present to yield a finished latex having the following composition:

| Component: | Weight percent |
|---|---|
| Butyl rubber | 34 |
| Water | 66 |

This latex contained essentially the same proportion of emulsifiers which were present in the raw latex.

A four liter resin flask was charged with about 8 lbs. of molten Wood's metal alloy and 1000 cc. of the prestripped latex described above. In order to maintain the Wood's metal alloy in the liquid state, the flask was submerged in a bath heated to 170° F. The flask was fitted with an agitator, an overhead condenser for stripped solvent, a steam inlet below the surface of the molten metal, an inlet for fresh latex extending beneath the latex surface at the metal surface, and an outlet conduit for finished butyl rubber latex, said outlet being in the form of a conduit in an upper portion of the raw latex layer.

Starting at 9:30 a.m. the bath was regulated to 168° F. giving a flash temperature of 130° F. and 1315 ccs. of the raw latex described above were introduced. No visibible hexane was at that time coming off. Simultaneously steam was introduced into the steam inlet conduit giving a flash temperature of about 170° F. This steam bubbling through the Wood's metal alloy up into the raw butyl rubber latex caused the amounts of hexane to be driven off as indicated in the following table.

*Table I*

| Time, a.m. | Temp., ° F. | | Feed Burette, cc. Contents | Hexane Off, cc. | Comments |
|---|---|---|---|---|---|
| | Bath | Flask | | | |
| 9:30 | 168 | 130 | 1,830 | | Feed and Steam In. |
| 9:40 | | | | Start | |
| 9:45 | 172 | 164 | 1,640 | 30 | |
| 10:00 | 177 | 165 | 1,490 | 100 | |
| 10:15 | 175 | 168 | 1,325 | 170 | |
| 10:30 | 172 | 165 | 1,140 | 240 | |
| 10:45 | 172 | 169 | 990 | 320 | |
| 11:00 | 174 | 175 | 830 | 450 | |
| 11:15 | 177 | 181 | 660 | 575 | |
| 11:30 | 179 | 182 | 515 | 640 | Voluntarily terminated. |

In summary, the raw feed contained 15.8 weight percent N.V.M. and the finished product latex contained 23.8 weight percent N.V.M. The coagulation out of a total of 168 grams of polymer charged to the system as raw latex was found to be less than 1%. The hexane removed was essentially complete. The above data show that by stripping a raw latex through an underlying immiscible liquid layer of higher specific gravity, very low coagulation results.

Resort may be had to variations and modifications of the disclosed embodiments without departing from the spirit of the invention or the scope of the appended claims.

What is claimed is:

1. In a process for stripping a solvent from a rubbery polymer latex comprising a rubbery polymer selected from the group consisting of butyl rubber copolymer of a major proportion of an isoolefin with a minor proportion of a multiolefin, a butadiene-styrene copolymer, natural rubber, a butadiene-acrylonitrile copolymer, polychloroprene, and halogenated butyl rubber copolymer of an isoolefin with a multiolefin, and a $C_5$ to $C_{10}$ hydrocarbon solvent, the improvement which comprises providing an upper layer of the rubbery latex and a lower immiscible liquid layer selected from the group consisting of Wood's metal alloy, mercury, and gallium; and introducing the stripping medium selected from the group consisting of steam, nitrogen, carbon dioxide, methane, ethane, and propane into said lower layer to volatilize the solvent from said upper layer.

2. In a process for stripping a solvent from a rubbery polymer latex comprising a rubbery polymer selected from the group consisting of butyl rubber copolymer of a major proportion of an isoolefin with a minor proportion of a multiolefin, a butadiene-styrene copolymer, natural rubber, a butadiene-acrylonitrile copolymer, polychloroprene, and halogenated butyl rubber copolymer of an isoolefin with a multiolefin, and a $C_5$ to $C_{10}$ hydrocarbon solvent; the steps which comprise introducing a rubbery polymer latex into a stripping zone as an upper layer therein; providing a lower immiscible liquid layer selected from the group consisting of Wood's metal alloy, mercury, and gallium, in the stripping zone; and introducing a stripping medium selected from the group consisting of steam, nitrogen, carbon dioxide, methane, ethane, and propane through said lower immiscible layer to continuously strip the solvent from the rubbery solution in the upper layer.

3. A process according to claim 1 in which the rubber is butyl rubber copolymer of a major proportion of an isoolefin with a minor proportion of a multiolefin.

4. A process according to claim 1 in which the lower immiscible liquid layer comprises molten Wood's metal alloy.

5. A process according to claim 2 in which the rubber comprises butyl rubber copolymer of a major proportion of an isoolefin with a minor proportion of multiolefin.

6. A process according to claim 2 in which the rubber comprises halogenated butyl rubber copolymer of a major proportion of an isoolefin with a minor proportion of a multiolefin.

7. A process according to claim 2 in which the rubber comprises natural rubber.

8. A process according to claim 2 in which the rubber comprises polychloroprene rubber.

9. A process according to claim 2 in which the rubber comprises a butadiene-styrene copolymer.

10. A process according to claim 2 in which the rubber comprises a butadiene-acrylonitrile copolymer.

11. A process according to claim 2 in which the solvent stripped off comprises hexane.

12. A process according to claim 2 in which the lower immiscible liquid layer comprises mercury.

13. A process according to claim 2 in which the lower immiscible liquid comprises Wood's metal alloy.

References Cited in the file of this patent

UNITED STATES PATENTS 2,821,515   Jaros ---------------- Jan. 28, 1958